US012521299B1

(12) United States Patent
Zhang

(10) Patent No.: US 12,521,299 B1
(45) Date of Patent: Jan. 13, 2026

(54) DATA CABLE AND MASSAGE CONTROL METHOD THEREOF

(71) Applicant: Dongguan Aikede Electronic Technology Co., Ltd, Dongguan (CN)

(72) Inventor: Dehui Zhang, Dongguan (CN)

(73) Assignee: DONGGUAN AIKEDE ELECTRONIC TECHNOLOGY CO., LTD, Dongguan (CN)

( * ) Notice: Subject to any disclaimer, the term of this patent is extended or adjusted under 35 U.S.C. 154(b) by 0 days.

(21) Appl. No.: 18/901,004

(22) Filed: Sep. 30, 2024

(30) Foreign Application Priority Data

Aug. 30, 2024 (CN) ......................... 202411213391.5
Aug. 30, 2024 (CN) ......................... 202422134280.7
Sep. 2, 2024 (CN) ......................... 202411222848.9
Sep. 2, 2024 (CN) ......................... 202422151773.1

(51) Int. Cl.
*A61H 7/00* (2006.01)

(52) U.S. Cl.
CPC ..... *A61H 7/004* (2013.01); *A61H 2201/0107* (2013.01); *A61H 2201/5002* (2013.01); *A61H 2201/501* (2013.01)

(58) Field of Classification Search
CPC .................... A61H 11/00–02; A61H 2011/005
See application file for complete search history.

(56) References Cited

U.S. PATENT DOCUMENTS 6,645,128 B1 * 11/2003 Hur .................... A63B 21/0004 482/121
9,699,294 B1 * 7/2017 Yao ........................ A61N 1/322
2003/0114902 A1 * 6/2003 Prescott ............... A61N 5/0616 607/89
2009/0099413 A1 * 4/2009 Kobashikawa ........ A61H 19/44 600/38

(Continued)

FOREIGN PATENT DOCUMENTS

CN 204517088 U * 7/2015
CN 205335541 U 6/2016

(Continued)

OTHER PUBLICATIONS

Translation of CN 113679584 (Year: 2021).*

(Continued)

*Primary Examiner* — Paige Kathleen Bugg
(74) *Attorney, Agent, or Firm* — Andrew C. Cheng

(57) ABSTRACT

The present disclosure relates to the technical field of charging, in particular to a data cable and a massage control method thereof. The data cable comprises a first input/output module, a master control module, a massage module and/or a second input/output module which are sequentially connected; the first input/output module and/or the second input/output module are connected with external device for inputting and outputting electrical signals and data signals; the master control module sends out control signals for controlling the start-stop and/or adjustment modes of the massage module; the massage module comprises a massage (Continued)

function part, and the massage function part performs a massage action according to the control signals. The data cable of the present disclosure can not only realize the basic functions of data transmission, device charging and the like, but also enjoy massage at the same time.

17 Claims, 8 Drawing Sheets

(56) References Cited

U.S. PATENT DOCUMENTS

| | | | | |
|---|---|---|---|---|
| 2010/0292531 | A1* | 11/2010 | Beaulieu | A61H 19/30 600/38 |
| 2017/0333727 | A1* | 11/2017 | Kim | A61N 5/06 |
| 2023/0115727 | A1* | 4/2023 | Sridhar | A61H 23/0263 601/70 |
| 2023/0329960 | A1* | 10/2023 | Persidsky | A61H 15/0078 |
| 2024/0250685 | A1* | 7/2024 | Waters | H03K 19/018521 |
| 2024/0299236 | A1* | 9/2024 | Gao | A61H 15/02 |
| 2024/0366468 | A1* | 11/2024 | Gutierrez | A61H 23/02 |

FOREIGN PATENT DOCUMENTS

| | | | | | |
|---|---|---|---|---|---|
| CN | 209270636 | U | * | 8/2019 | |
| CN | 113679584 | A | * | 11/2021 | A61F 7/00 |
| CN | 116392377 | A | * | 7/2023 | A61H 23/02 |
| TW | M534468 | U | | 12/2016 | |
| WO | WO-2017004855 | A1 | * | 1/2017 | A61H 23/02 |
| WO | WO-2022193117 | A1 | * | 9/2022 | |

OTHER PUBLICATIONS

Translation of WO 2017/004855 (Year: 2017).*
Translation of WO 2022/193117 (Year: 2022).*
Translation of CN 116392377. Accessed from PE2E-SEARCH on Sep. 2, 2025. (Year: 2023).*
Translation of CN 204517088. Accessed from PE2E-SEARCH on Sep. 2, 2025. (Year: 2015).*
Translation of CN 209270636. Accessed from PE2E-SEARCH on Sep. 2, 2025. (Year: 2019).*

* cited by examiner

DATA CABLE AND MASSAGE CONTROL METHOD THEREOF

TECHNICAL FIELD

The present disclosure relates to the technical field of charging, in particular to a data cable and a massage control method thereof.

BACKGROUND OF THE INVENTION

With the rapid development of science and technology, people are not only enjoying the convenience brought by electronic products, but also facing the health problems brought by long-term use of electronic products. The design of traditional data cables often focuses on efficient and stable data circulation and energy supply, but ignores the accompanying "digital health" challenges. Operating electronic equipment with bad posture for a long time, such as looking down at the screen and operating with stiff wrists, has become a hotbed of health problems such as neck stiffness, muscle soreness, and even cervical spondylosis and carpal tunnel syndrome. These problems not only erode our work efficiency and creativity, but also quietly erode the quality of life, and even have the potential to evolve into more serious health problems.

In view of this, the innovation of data cable technology is imminent, and it is urgent to integrate health concepts and technological innovations to alleviate or even solve the health problems encountered by users due to long-term use of electronic products. Although a small number of data cables combine physical therapy function, the structures are complex, the user's operations are inconvenient, the massage effect is not ideal, and the usage scenarios are very limited.

SUMMARY OF THE INVENTION

In order to solve the technical problem that users encounter health problems due to long-term use of electronic products, the present disclosure provides a data cable and a massage control method thereof.

In order to solve the above technical problems, the present disclosure provides the following technical solution: a data cable which includes a first input/output module, a master control module, a massage module and/or a second input/output module which are connected in sequence; the first input/output module and/or the second input/output module are connected with external device for inputting and outputting electrical signals or data signals; the master control module receives and transmits the electrical signals or data signals, and at the same time sends out control signals for controlling the start-stop and/or adjustment mode of the massage module; and the massage module comprises massage function parts, and the massage function parts perform a massage action according to the control signals.

In order to solve the above technical problems, the present disclosure provides another technical solution as follows: a data cable massage control method, wherein the data cable includes a first input/output module, a master control module, a massage module and/or a second input/output module which are connected in sequence; wherein the method includes: acquiring a control signal of the massage master control module based on a user instruction; the first input/output module or the second input/output module inputting an electrical signal to supply power to the massage module; and controlling the massage module to perform massage actions based on the control signal.

Preferably, the method further includes controlling different working modes of the data cable based on user instructions; the working modes include a mode that the data cable only transmits data signals and/or electrical signals, a mode that the data cable performs massage actions while transmitting data signals and/or electrical signals, and a mode that the data cable only performs massage actions.

Compared with the prior art, the data cable and the massage control method thereof provided by the present disclosure have the following beneficial effects:

1. The data cable provided by the present disclosure can not only realize the basic functions of data transmission, device charging and the like, but also enjoy massage at the same time. In addition, users can independently control the start, stop and adjustment modes of the massage module through the master control module, which is simple and convenient to operate and improves the personalization and flexibility of massage. The first input/output module, the master control module, the massage module and/or the second input/output module are connected in sequence, so that the overall appearance of the data cable is simple and neat, and it is convenient for storage and sorting.

2. The present disclosure also provides a data cable massage control method, wherein the data cable comprises a first input/output module, a master control module, a massage module and/or a second input/output module which are connected in sequence, and is used for the data cable, the method includes the following steps: acquiring a control signal of the massage master control module based on a user instruction; the first input/output module or the second input/output module inputting an electrical signal to supply power to the massage module; and controlling the massage module to perform massage actions based on the control signal. The method is simple and intuitive to operate, and the user can operate the massage module to perform massage actions only by inputting user instructions, and the massage module can supply power through the first input/output module or the second input/output module, which is convenient for the user to operate and does not need to identify the direction of the data cable.

BRIEF DESCRIPTION OF DRAWINGS

In order to explain the technical solution in the embodiment of the present disclosure more clearly, the drawings needed in the description of the embodiment or the prior art will be briefly introduced below. Obviously, the drawings in the following description are only some embodiments of the present disclosure. For those skilled in the art, other drawings can be obtained according to these drawings without paying creative labor.

DESCRIPTION OF REFERENCE SIGNS

1, Data cable; 2, Data cable; 3, Data cable;

11, First input/output module; 12, Master control module; 13, Massage module; 14, Second input/output module; 15, Data cable body; 21, Cavity; 22, Elastic structure; 31, Massage accessory;

123, Functional control unit; 124, Signal input unit; 125, Voltage conversion unit; 126, Output interface; 131, Massage function part; 132, Flexible circuit structure; 133, Shell; 134, Massage part; 135, Massage structure; 210, Boss; 220, First annular groove; 221, Annular projection; 222, Second annular groove.

DETAILED DESCRIPTION OF THE INVENTION

In order to make the object, technical solution and advantages of the present disclosure more clear, the present disclosure will be further explained in detail with reference to the drawings and embodiments. It should be appreciated that the specific embodiments described here are only used to explain the present disclosure, and are not used to limit the present disclosure.

Figure 1:
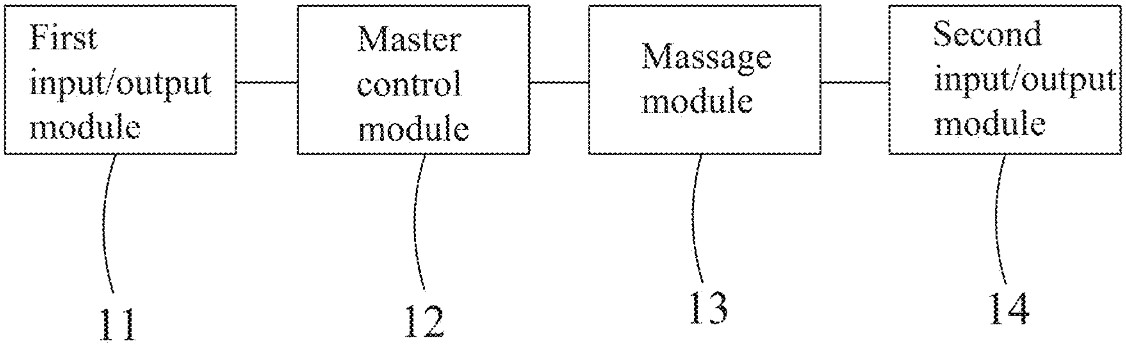
FIG. 1 is a schematic diagram of a data cable provided by a first embodiment of the present disclosure.
Figure 2:
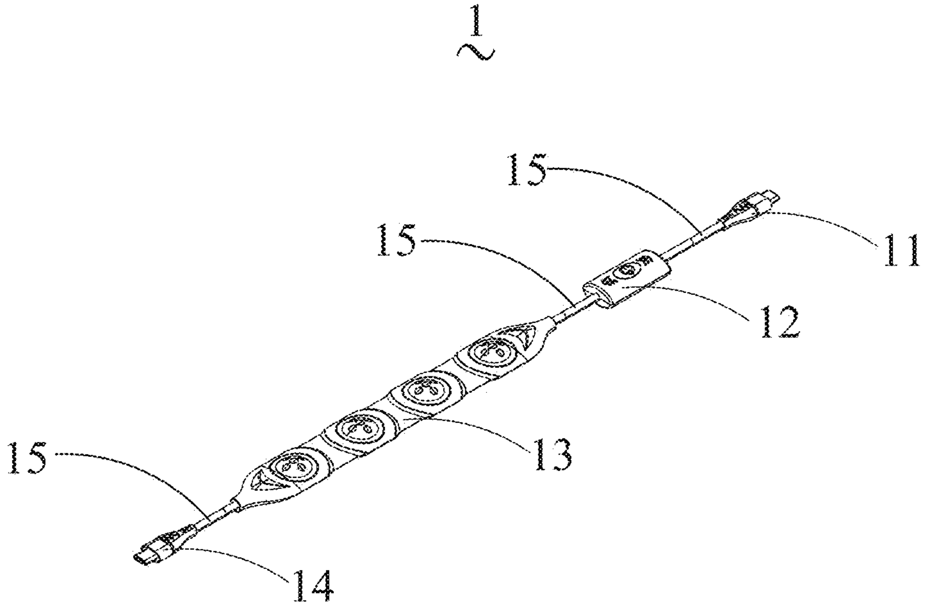
FIG. 2 is a perspective view of a data cable provided by the first embodiment of the present disclosure.
Figure 3:
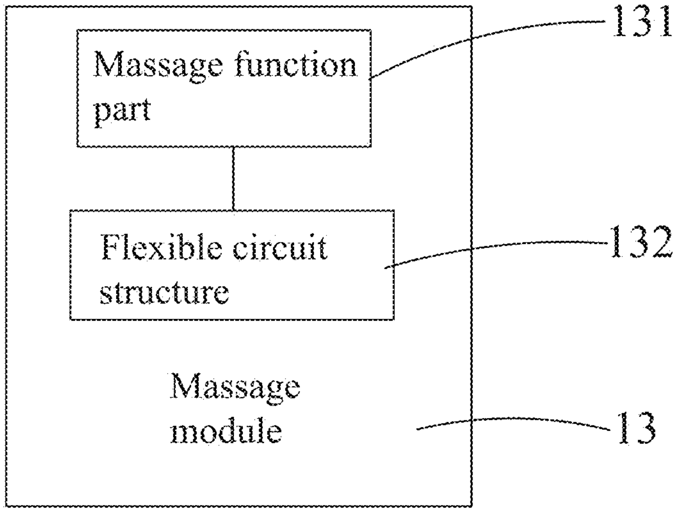
FIG. 3 is a schematic frame diagram of the massage module of the data cable provided by the first embodiment.

Referring to FIGS. 1, 2 and 3, a first embodiment of the present disclosure provides a data cable 1, which includes a first input/output module 11, a master control module 12, a massage module 13 and/or a second input/output module 14 connected in sequence.

The first input/output module 11 and/or the second input/output module 14 are connected with external devices for inputting and outputting electrical signals and data signals.

It can be appreciated that the first input/output module 11 and the second input/output module 14 are connected with external electronic devices such as mobile phones and notebook computers, which can not only realize the functions of data transmission and electric transmission, but also supply power to the master control module 12 and the massage module 13 through external devices.

It can be appreciated that the first input/output module 11 and the second input/output module 14 may be provided at the same time, or only one of them may be provided. When only one of them is provided, the data cable 1 is for single-ended input, and the first input/output module 11 or the second input/output module 14 is only used for power supply and data transmission for the master control module 12 and the massage module 13.

Alternatively, the first input/output module 11 and the second input/output module 14 may be the same or different. Specifically, the first input/output module 11 and the second input/output module 14 may be USB Type-A connectors, USB Type-B connectors, USB Type-C connectors, Lightning connectors and the like.

The master control module 12 receives and transmits electrical signals and data signals, and at the same time sends out control signals for controlling the start-stop and/or adjustment modes of the massage module 13.

It can be appreciated that on the one hand, the master control module 12 plays a transmission role, ensuring that the electric signal and data signal of the data cable 1 can be transmitted normally; on the other hand, as a control center, it is used to control the start, stop and different adjustment modes of the massage module 13. Users can change the adjustment mode according to their own preferences, which improves the personalization and flexibility of massage.

The massage module 13 receives and transmits electrical signals and data signals, and receives control signals at the same time. The massage module 13 includes massage function parts 131, and the massage function parts 131 perform massage actions according to the control signals.

It can be appreciated that on the one hand, the massage module 13 plays a transmission role to ensure the normal transmission of the electrical signal and data signal of the data cable 1; on the other hand, the massage function parts 131 provide massage actions for the user according to the control signals to meet the massage needs of the user, so that the data cable 1 can meet the massage needs of the user while transmitting electrical signals or data signals.

It can be appreciated that the first input/output module 11, the master control module 12, the massage module 13 and the second input/output module 14, which are connected in sequence, make the overall appearance of the data cable 1 simple and neat, and facilitate storage and sorting.

Further, the data cable 1 also includes a data cable body 15, and the first input/output module 11, the master control module 12, the massage module 13 and the second input/output module 14 are sequentially connected in series through the data cable body 15 to form a continuous bidirectional communication link.

It can be appreciated that this design will not add additional branches to destroy the linear structure of the whole data cable 1, which is convenient for storage and arrangement, and users can use the linear structure of the data cable 1 to realize winding and fixing to body parts. For example, the cable is wound and fixed to the wrist, neck and other curved parts, the massage module 13 can be fixed more securely to fit the human body more closely, which is convenient for users to operate, and increase the usage scenarios of the data cable 1 for massage, so that better massage experience and massage effect can be obtained.

It can be appreciated that the data cable body 15 can be made of light, soft and good performance material, which is convenient for storage and carrying, and is convenient for users to use the data cable body 15 to wind and fix the massage module 13. For example, the data cable body 15 may be a nylon cloth braided data cable or a silica gel data cable.

Further, the first input/output module 11, the master control module 12, the massage module 13 and the second input/output module 14 of the data cable 1, and the data cable body 15 support the same fast charging protocol, such as USB-PD (USB Power Delivery) protocol, which can improve the charging power and shorten the charging time when the data cable 1 charges external devices. At the same time, different voltage and current requirements of the master control module 12 and the massage module 13 may also be supported.

Figure 4:
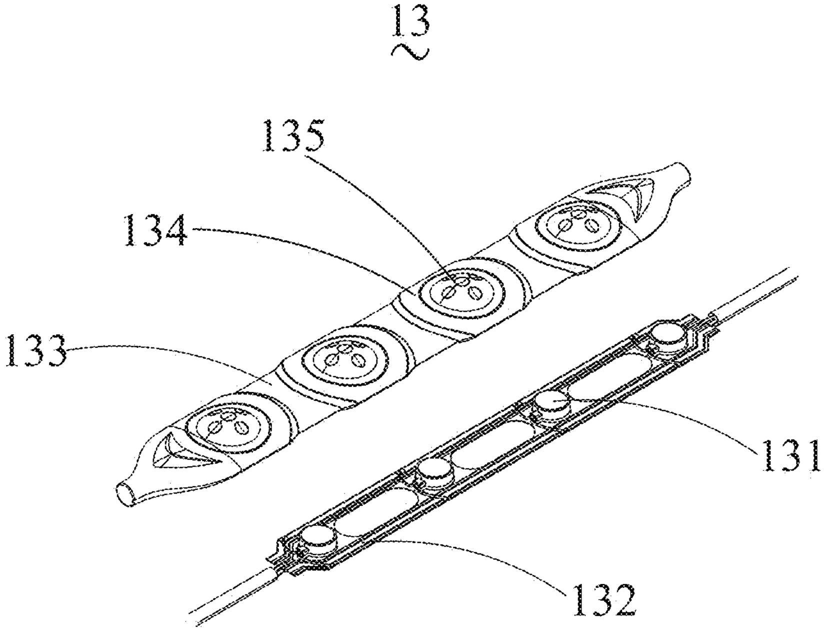
FIG. 4 is an exploded schematic view of the massage module of the data cable provided in the first embodiment of the present disclosure.

Further referring to FIGS. 3 and 4, the massage module 13 includes a flexible circuit structure 132, and the massage function parts 13 are electrically connected with the master control module 12 through the flexible circuit structure 132.

It can be appreciated that the flexible circuit structure 132 includes a driving circuit for the massage function parts 131, which can drive the massage function parts 131 to work. The flexible circuit structure 132, that is, the circuit structure of the massage module 13, is flexible, so that the massage module 13 is flexible as a whole. At the same time, with the characteristic that the data cable 1 can be wound as a whole, it is convenient for the massage module 13 to better conform to the curve of the human body and contact the massaged part more closely, so that the user can get a better massage experience.

It can be appreciated that the massage function parts 131 are electrically connected with the master control module 12 through the flexible circuit structure 132, so that they can quickly respond to the control signals of the master control module 12 and give real-time feedback to the user's use demand, and can more accurately meet the user's needs and expectations.

Further, there are at least two massage function parts 131.

It can be appreciated that the massage module 13 is provided with a plurality of massage function parts 131, which can enhance the massage effect. A plurality of massage modules 13 cooperate with each other to form a variety of different massage modes, increasing the types of adjustment modes that can be controlled by the master control module 12, and bringing a variety of different massage experiences to users.

Further, the massage function parts 131 is arranged on the central axis of the massage module 13.

It can be appreciated that the massage function part 131 plays the role of counterweight. By arranging it on the central axis of the massage module 13, the center of gravity of the whole massage module 13 can be located on the central axis. When the massage module 13 is attached to the human body for massage, it is not likely to turn up due to the shift of the center of gravity, which reduces the twisting and winding of the data cable 1 during use and improves the user experience.

Further, the wires and elements of the flexible circuit structure 132 can be symmetrically arranged on both sides of the central axis of the massage module 13 to play a role of counterweight, further ensuring that the center of gravity of the whole massage module 13 is located on the central axis. At the same time, the symmetrical arrangement can further improve the performance and stability of the circuit, and help to quickly identify various components and connection relationships, thus improving the readability and maintainability of the flexible circuit structure 132.

Further, the massage function parts 131 are sequentially arranged at intervals along the length direction of the massage module 13.

It can be appreciated that the massage function parts 131 are arranged along the length direction of the massage module 13, that is, the layout direction of the massage function parts 131 is the same as the overall length direction of the data cable 1, so that a wider massage area can be formed and a multi-dimensional massage effect can be achieved at the massage part. For example, when the user wraps the massage module 13 around the neck, shoulders and other parts, the plurality of massage function parts 131 can massage a plurality of parts or acupoints at the same time, thus achieving multi-dimensional and multi-level massage effects.

Moreover, there are gaps between the massage function parts 131 arranged at intervals, and the bending radian of the massage module 13 can be adjusted by changing the size of the gaps, so that the overall design of the data cable 1 is more flexible.

Further, the massage function parts 131 are arranged in parallel through a flexible circuit structure 132.

It can be appreciated that that parallel connection between the massage function parts 131 improves the reliability and stability of the data cable 1. When a single massage function parts 131 fails, other massage function parts 131 can still work normally, thus preventing the paralysis of the whole massage module 13, having high fault tolerance, reducing the risk of failure due to a single point of failure, and each massage function parts 131 can operate and maintain independently, which is helpful to reduce the maintenance cost and prolong the service life. In addition, the parallel design facilitates the unified control of the master control module 12 on a plurality of massage function parts 131, and simplifies the operation of users.

Further, the massage module 13 also includes a bendable shell 133, and the shell 133 is provided with a flexible massage part 134 corresponding to the massage function parts 131, and two opposite sides of the massage part 134 are provided with massage structures 135.

It can be appreciated that in order to achieve a better fit between the massage module 13 and the human body, the massage module 13 can protect the flexible circuit structure 132 and the massage function parts 131 with the bendable shell 133. The bendable shell 133 can reduce the impact of collision and wear on the internal circuits and components of the massage module 13, and at the same time, it can increase the flexibility of the massage module 13 when it is bent and prolong its service life.

Alternatively, the shell 133 can be made of rubber, plastic, silica gel and other materials to realize its bendable characteristics.

It can be appreciated that in order to enhance the massage effect of the massage module 13, a flexible massage part 134 is further provided on the bendable shell 133 corresponding to the position of the massage function parts 131. The massage part 134 can not only reduce the attenuation of massage intensity, but also reduce the pressure of the massage module 13 on the skin to avoid discomfort or pain. At the same time, it can make the distribution of massage force more uniform and improve the user's experience.

It can be appreciated that providing massage structures 135 on opposite sides of the massage part 134 can provide a richer massage experience. Alternatively, the massage structures 135 on both sides may be the same or different. Specifically, in this embodiment, the shape of the massage structure 135 is not limited, for example, the massage structure 135 can be a convex arc structure, a strip groove, an array of convex points and concave points, a wavy structure, a spiral structure, a spherical structure, and the like.

Further, the data cable 1 includes a bidirectional signal identification circuit for identifying the transmission directions of electric signals and data signals.

It can be appreciated that the bidirectional signal identification circuit is used to detect the connection of external devices and determine the transmission directions of electrical signals and data signals. The bidirectional transmission of electrical signals and data signals can be achieved, that is, electrical signals and data signals can be transmitted from the first input/output module 11 to the second input/output module 14 or from the second input/output module 14 to the first input/output module 11. The master control module 12 and the massage module 13 can be powered by external devices connected to the first input/output module 11 or by external devices connected to the second input/output module 14.

Figure 5:
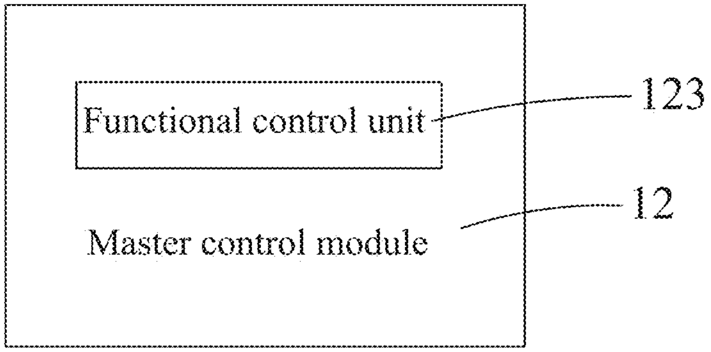
FIG. 5 is a first schematic diagram of the master control module of the data cable provided in the first embodiment.

Specifically, in this embodiment, the bidirectional signal identification circuit is realized by an On-The-Go circuit, which is a circuit system for implementing the On-The-Go function. The first input/output module 11 and the second input/output module 14 with the On-The-Go function can identify whether an external device is a master or a slave. When it is detected that the external device is a master, the device can output power to the slave, and when it is detected that the external device is a slave, it can receive power from the master. The On-The-Go function can also switch the roles of external devices as needed, for example converting from a master to a slave, or converting from a slave to a master. This enables the data cable 1 to provide power for the master control module 12 and the massage module 13 as long as the first input/output module 11 or one end of the second input/output module 14 is connected with an external device, such as a mobile phone, a notebook computer, etc., which greatly expands the usage scenario of the massage function of the data cable 1, facilitates the user to massage at any time and anywhere, and improves the user experience Please refer to FIG. 5 further, the master control module 12 includes a functional control unit 123, which is electrically connected with the massage module 13 and used for receiving user instructions and outputting corresponding control signals to the massage module 13 according to the user instructions.

It can be appreciated that the setting of the functional control unit 123 enables the user to control the massage module 13 through the master control module 12, and the user can adjust the massage mode, intensity, speed and other parameters of the massage module 13 according to his own needs and preferences, thus realizing personalized massage experience.

It can be appreciated that the functional control unit 123 can further monitor the running state of the massage module 13, and once abnormal conditions, such as overheating and overload, are detected, the power supply can be immediately cut off or the working mode can be adjusted to ensure the safety of users and equipment.

Figure 6:
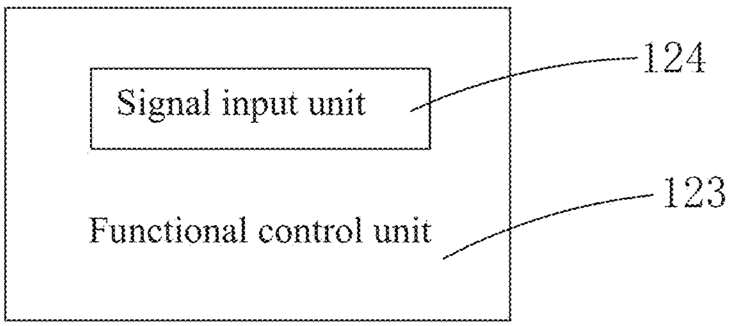
FIG. 6 is a schematic diagram of a functional control unit of a data cable provided in the first embodiment.

Referring to FIG. 6, the functional control unit 123 includes a signal input unit 124 through which user instructions are received.

It can be appreciated that the setting of the signal input unit 124 can enhance the interactive ability and flexibility between the user and the massage device. In this embodiment, the specific form of the signal input unit 124 is not limited, for example, the signal input unit 124 may be a control button, a touch screen, voice control, wireless remote control, etc.

Preferably, the signal input unit 124 is a control button, and there may be one control button or a plurality of control buttons. The control button is intuitive and easy to use, has strong adaptability, can reduce misoperation, has a simple structure, does not need complicated circuit design, and can effectively reduce the volume and weight of the data cable 1 massage control system. Moreover, the massage function parts 131 are arranged in parallel on the flexible circuit structure 132, so that one-button control of the control buttons can be realized through the control circuit, which can simplify the operation flow and enable users to use the massage function of the data cable 1 more easily.

Further, user instructions can also be input through an external device connected to the first input/output module 11 or the second input/output module 14.

It can be appreciated that an application program for receiving user instructions can be set on the external device. After the user instructions are input by the application program, they are transmitted to the master control module 12 by the first input/output module 11 or the second input/output module 14, so as to control the start-stop and adjustment modes of the massage module 13. This design can provide a more intuitive and convenient operation interface on external devices, and users can make customization according to their own preferences.

It can be appreciated that a signal receiver connected with the massage module can be further arranged on the data cable 1, for receiving user instructions from external devices, that is, the control of the massage module 13 can still be realized when the external devices are not connected with the first input/output module 11 or the second input/output module 14.

Figure 7:
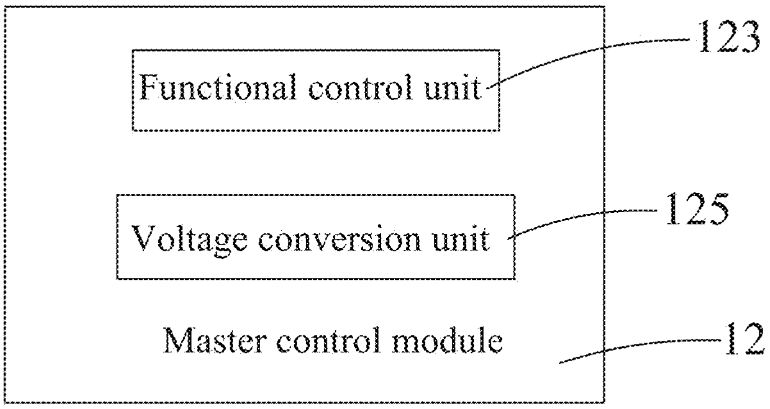
FIG. 7 is a second schematic diagram of the master control module of the data cable provided in the first embodiment.

Further referring to FIG. 7, the master control module 12 further includes a voltage conversion unit 125. The first voltage introduced from the first input/output module 11 or the second voltage introduced from the second input/output module 14 is converted into a third voltage by the voltage conversion unit 125, and the third voltage is introduced into the massage function parts 131.

It can be appreciated that the voltage conversion unit 125 can be a DC-DC conversion circuit. The first voltage and the second voltage can be input from a power supply or an external device, therefore, the voltage values of the input first voltage and the second voltage may be different, and the massage function is not supported to work. Converting the first voltage or the second voltage input by the first input/output module 11 or the second input/output module 14 into the stable third voltage required by the massage module 13 can ensure the stable operation of the functional control unit 123 and the massage module 13, so that each element will not be damaged due to the excessively high input voltage, and the operation efficiency will not be reduced due to the excessively low voltage, thereby better deriving the massage function parts 131 to work.

Further, the data cable 1 includes a main charging circuit for charging and a massage branch circuit connected in parallel with the main charging circuit, and the massage function parts 131 is arranged on the massage branch circuit.

It can be appreciated that the main charging circuit is used to ensure that the electric signal of data cable 1 can be transmitted normally. The massage branch circuit is used to support the work of the massage module, and can obtain the electrical signal for supporting the work of the massage module from the main charging circuit. The parallel design of the two circuits makes the main charging circuit and the massage branch circuit independent of each other, without affecting each other. Whether the massage function part 131 works or not will not affect the working state of the main charging circuit, and the massage function part 131 can still work normally when the data cable 1 is connected with equipment for charging or data transmission. This design makes the data cable 1 easier to maintain, and even if the massage branch circuit fails, the main charging circuit can still work normally without affecting the use.

Further, the voltage conversion unit 125 is arranged on the massage branch circuit.

It can be appreciated that setting the voltage conversion unit 125 on the massage branch circuit ensures that the first voltage and the second voltage will be converted through the voltage conversion unit 125 to obtain the third voltage available for the massage function parts 131, further ensuring the normal operation of the massage function parts 131.

Further, the massage action is one or more of vibration signal, electric pulse signal and thermal signal.

It can be appreciated that the massage action is performed through the massage function parts 131. By changing the type of the massage function parts 131, the types of massage actions can be changed, and various massage actions can provide a richer massage experience. When the massage function parts 131 are vibrators, the massage action is a vibration signal output by the vibrators, and the vibration signal promotes muscle relaxation and relieves muscle tension through mechanical actions, which can effectively relieve muscle fatigue and soreness; When the massage function parts 131 are pulse generators, the massage action is electric pulse signals output by the pulse generators, which can stimulate nerves and muscles to achieve the effects of relieving muscle fatigue and promoting blood circulation. When the massage function parts 131 are heaters, the massage action is thermal signals output by the heater, and the thermal signals transfer heat to the skin and tissues to achieve the effect of hot compress. The massage action can also be other types of massage actions output by the massage function parts 131, for example cold compress.

Further, the adjustment mode includes one or more of massage intensity adjustment, massage mode adjustment and timing adjustment.

It can be appreciated that different adjustment modes can meet different needs of users, and massage intensity adjustment allows users to choose massage intensity according to their personal preferences and affordability. Massage mode adjustment can simulate different massage techniques and effects. For example, when the massage action of the massage function part is a vibration signal, the vibration effect changes from weak to strong, from weak to strong, or from fast to slow. Timing adjustment allows users to control massage time and prevent excessive massage. The types of adjustment modes can be adjusted by designing the function control circuit of the master control module 12, and each adjustment mode can be further divided into different gears.

Specifically, in this embodiment, the signal input unit 124 of the functional control unit 123 is set as a control button, and the user can start and stop the massage module 13 and adjust the massage intensities of the three gears by operating the control button. The control button is pressed to start the massage function of the massage module 13 and the massage intensity of the massage function part 131 is adjusted to a first gear; the control button is pressed again to adjust the massage intensity of the massage function parts 131 to a second gear; the control button again is pressed to adjust the massage intensity of the massage function parts 131 to a third gear; the control button is pressed again to turn off the massage function of the massage module 13. At the same time, the massage function of the massage module 13 can be turned off by pressing the control button for a long time.

Further, the data cable 1 may be further provided with an energy storage module, which is used for supplying power to the master control module 12 and the massage module 13 when the first input/output module 11 or the second input/output module 14 is not connected with an external device providing power.

Alternatively, the energy storage module may be a rechargeable energy storage module or a disposable battery.

It can be appreciated that when the energy storage module is a rechargeable energy storage module, when the first input/output module 11 or the second input/output module 14 is connected with an external device that provides power, the energy storage module can be charged for energy storage at the same time so as to be used for multiple times, which has high economy and environmental protection. The energy storage module is a disposable battery with a simple structure, and there is no need to worry about charging and battery life, which reduces maintenance cost and time. If the user does not need energy storage, the disposable battery can be disassembled to reduce the weight of the data cable 1.

Figure 8:
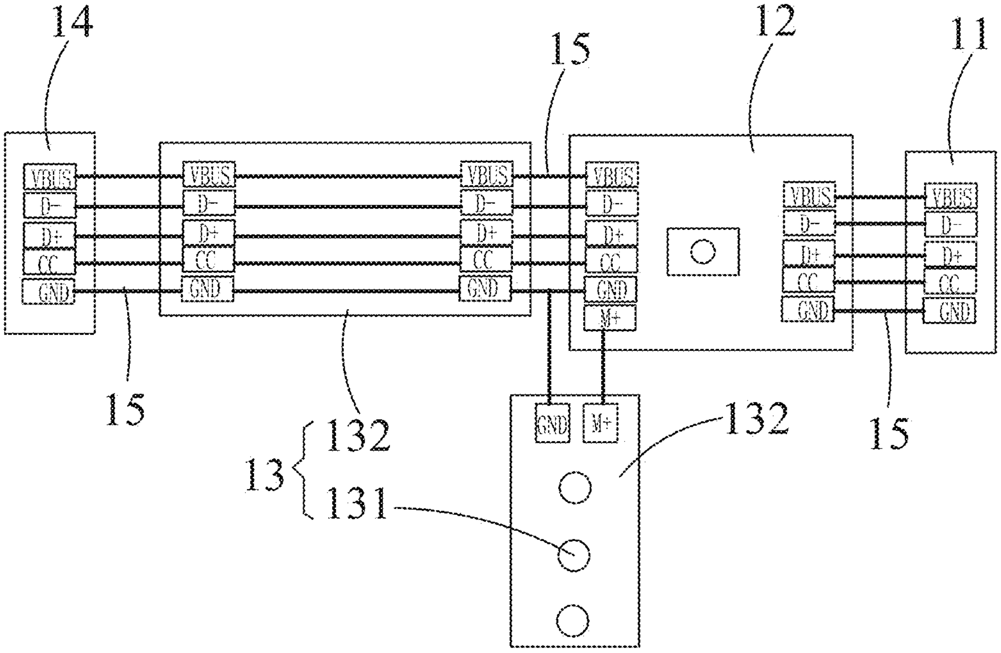
FIG. 8 is a schematic diagram of the circuit connection of the data cable provided by the first embodiment.

Please further refer to FIG. 8. For example, the first input/output module 11 and the second input/output module 14 are both Type-C interfaces with the On-The-Go function, which can realize bidirectional transmission of electrical signals and data cable 1 signals. The data cable body 15 between the master control module 12 and the first input/output module 11 is a five-core cable, which is respectively connected with the power wire VBUS, the ground wire GND, the positive data transmission wire D+, the negative data transmission wire D- and the configuration channel CC between the first input/output module 11 and the master control module 12, wherein the configuration channel CC is used to identify the role of external devices and ensure the bidirectional transmission of signals.

The data cable body 15 between the master control module 12 and the massage module 13 is a six-core cable, which is respectively connected with the power wire VBUS, the ground wire GND, the positive data transmission wire D+, the negative data transmission wire D−, the configuration channel CC, and the power wire M+ of the massage function parts 131 between the master control module 12 and the massage module 13. The configuration channel CC is used to identify the role of the external device, and the power wire M+ of the massage function parts 131 is used to provide power for the massage function parts 131 and transmit control signals from the master control module 12.

The data cable body 15 between the massage module 13 and the second input/output module 14 is a five-core cable, which is respectively connected with the power wire VBUS, the ground wire GND, the positive data transmission wire D+, the negative data transmission wire D− and the configuration channel CC between the first input/output module 11 and the master control module 12, wherein the configuration channel CC is used to identify the role of the external device.

The power wire VBUS, the ground wire GND, the positive data transmission wire D+, the negative data transmission wire D− and the configuration channel CC are sequentially connected with the first input/output module 11, the master control module 12, the flexible circuit structure 132 and the second input/output module 14, and this part is the main charging circuit. The electric signals of the main charging circuit can be input from both the first input/output module 11 and the second input/output module 14.

The power wire M+ that provides power for the massage function parts 131 and the ground wire GND of the massage function are massage branch circuits, and the ground wire GND of the massage function is connected with the ground wire GND on the main charging circuit, that is, the massage branch circuit and the main charging circuit share a ground wire GND. The massage branch circuit is arranged in parallel with the main charging circuit. Therefore, the electric signal supporting the massage function parts 131 can be input from both the first input/output module 11 and the second input/output module 14.

The massage function part 131 is electrically connected with the master control module 12 through the flexible circuit structure 132, and the main charging circuit and the massage branch circuit are respectively arranged on the front and back sides of the flexible circuit structure 132. A voltage conversion unit 125 (not shown in FIG. 8) is further provided in the massage branch circuit to ensure that the input voltage signal is converted into a voltage signal usable by the massage function parts 131 after passing through the voltage conversion unit 125.

Figure 9:
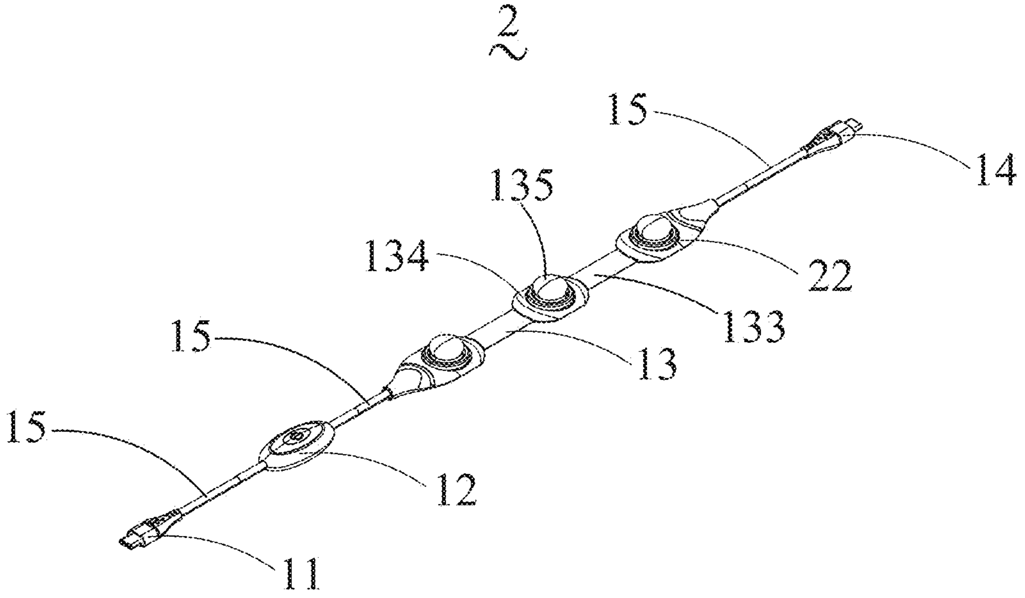
FIG. 9 is a perspective view of the data cable provided by a second embodiment.
Figure 10:
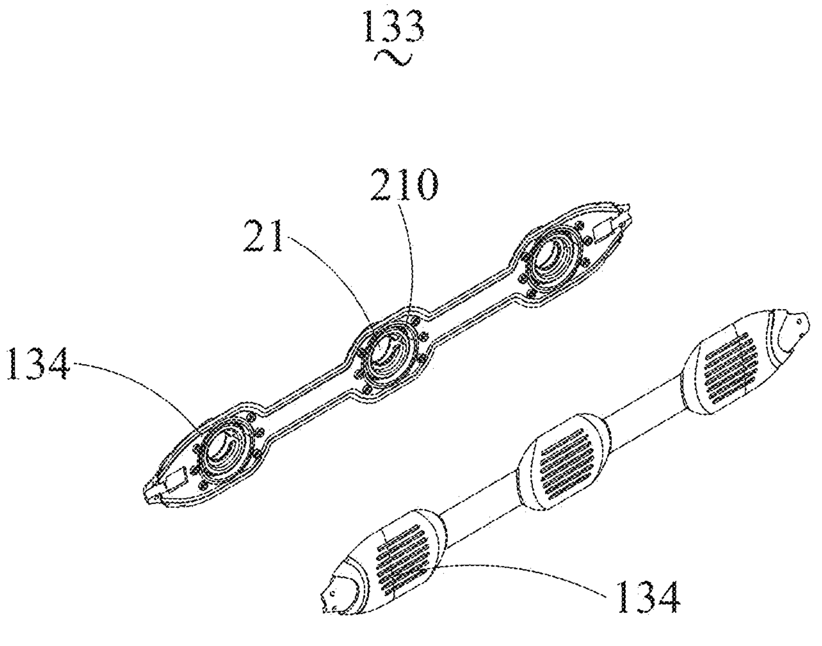
FIG. 10 is an explosion schematic diagram of the shell of the data cable provided by the second embodiment.
Figure 11:
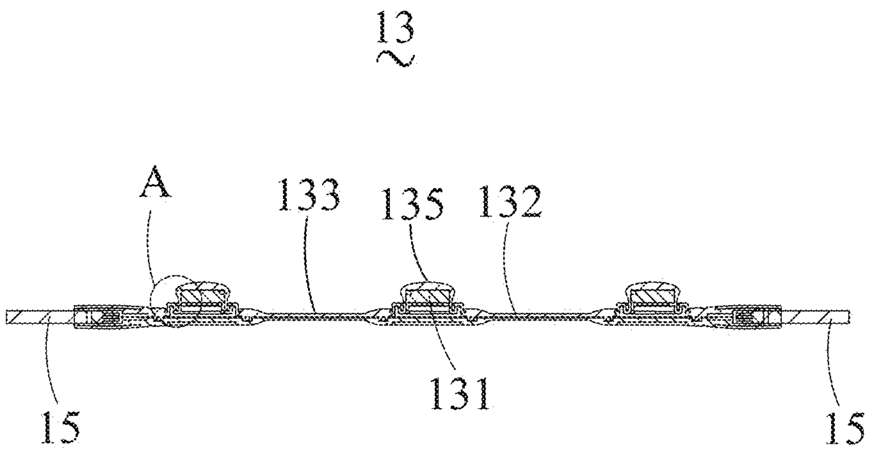
FIG. 11 is a schematic sectional view of the massage module of the data cable provided by the second embodiment.

Referring to FIGS. 9, 10 and 11, a second embodiment of the present disclosure provides another data cable 2, which is different from the above data cable 1 in that:

the massage part 134 is provided with a cavity 21 for accommodating the massage function parts 131, and the inner wall of the cavity 21 is provided with a boss 210.

It can be appreciated that the boss 210 can better fix the massage function parts 131 in the cavity 21, so that the massage function part 131 will not shift when it vibrates and massages, and can more effectively drive the massage part 134 to vibrate together, so as to better cooperate with the massage structure and obtain a superior massage experience.

It can be appreciated that when the massage function part 131 is a vibrator, the shape of the massage part 134 can be set according to the shape of the specific massage function part 131, so as to realize the tight wrapping of the massage function part 131. When the massage function part 131 vibrates, the tight wrapping can reduce the influence of air damping and other external factors on the vibration, so that the vibration energy can be transmitted to the target object more effectively, that is, the massage function part 131 can better drive the massage structure to vibrate and reduce the energy loss.

Specifically, in this embodiment, the massage structure on one side of the massage part 134 of the data cable 2 is set as a protrusion with a smooth appearance. The inside of the protrusion is provided with a cavity 21 matched with the massage function part, and the inner wall of the cavity 21 is provided with an annular boss 210, and the annular boss 210 is provided with a notch corresponding to the connecting pin of the massage function part 131. The main part of the massage function part 131 is fixed in the cavity 21 through the annular boss 210, and the connecting pin of the massage function 131 is exposed from the notch and connected to the flexible circuit structure 132.

It can be appreciated that when the massage function part 131 is a vibrator, the shell part between the massage parts 134 can be designed as thin as possible, and the width can be further narrowed, so that the attenuation of vibration can be reduced, the mutual influence among the massage function parts 131 can be avoided, and the overall weight of the data cable 2 can be reduced.

Figure 12:
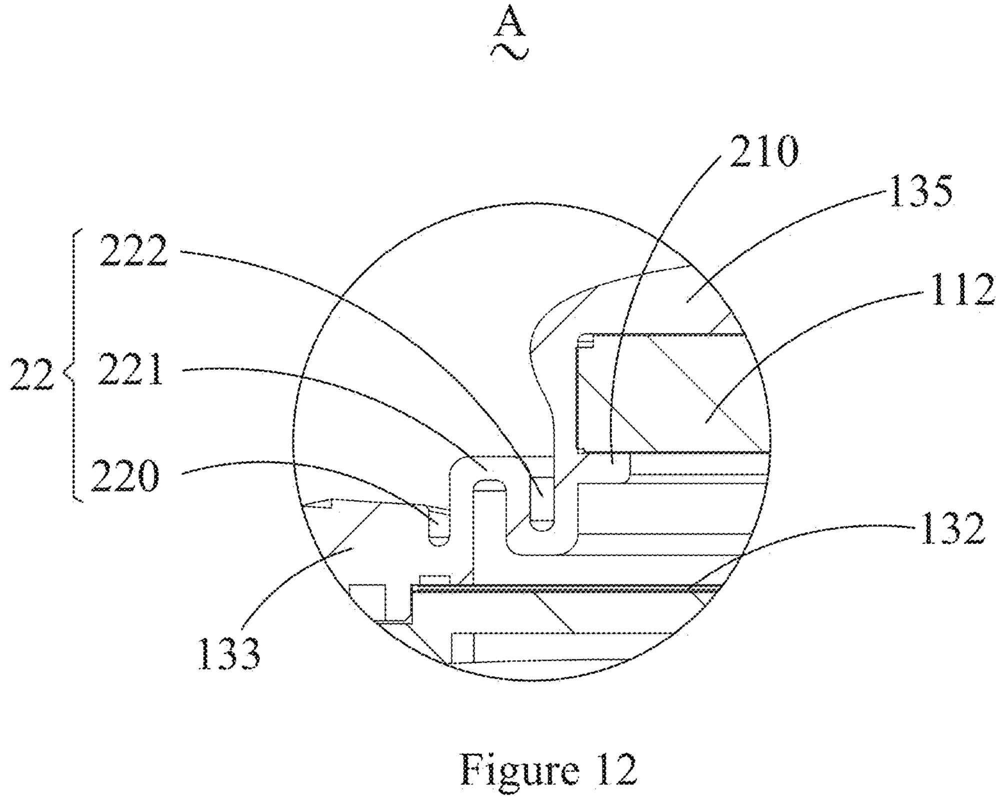
FIG. 12 is an enlarged view of A in FIG. 11.

Please further refer to FIG. 11 and FIG. 12, the periphery of the massage structure on at least one side of the data cable e 2 is provided with an elastic structure 22.

It can be appreciated that when the massage function part 131 is a vibrator, the elastic structure 22 can increase the range of motion when the massage function part 131 vibrates, increase the vibration space, and ensure the massage effect. At the same time, the vibration effect of the massage function parts 131 can be concentrated on the massage structure, which reduces the attenuation caused by the transmission of vibration to the rest of the shell 133, so that a better vibration massage experience can be obtained.

Alternatively, that elastic structure 22 comprise a first annular groove 220, an annular protrusion 221 and a second annular groove 222 which are sequentially connected.

It can be appreciated that the elastic structure 22 forms an approximately "arch" structure by sequentially connecting the first annular groove 220, the annular protrusion 221 and the second annular groove 222, which can effectively increase the vibration range of the massage function parts 131 in all directions, obtain better vibration massage effect, and effectively prevent vibration from spreading to other parts.

It can be appreciated that the remaining structures of the data cable 2 are the same as those of the data cable 1, and have the same beneficial effects, which will not be repeated here.

Figure 13:
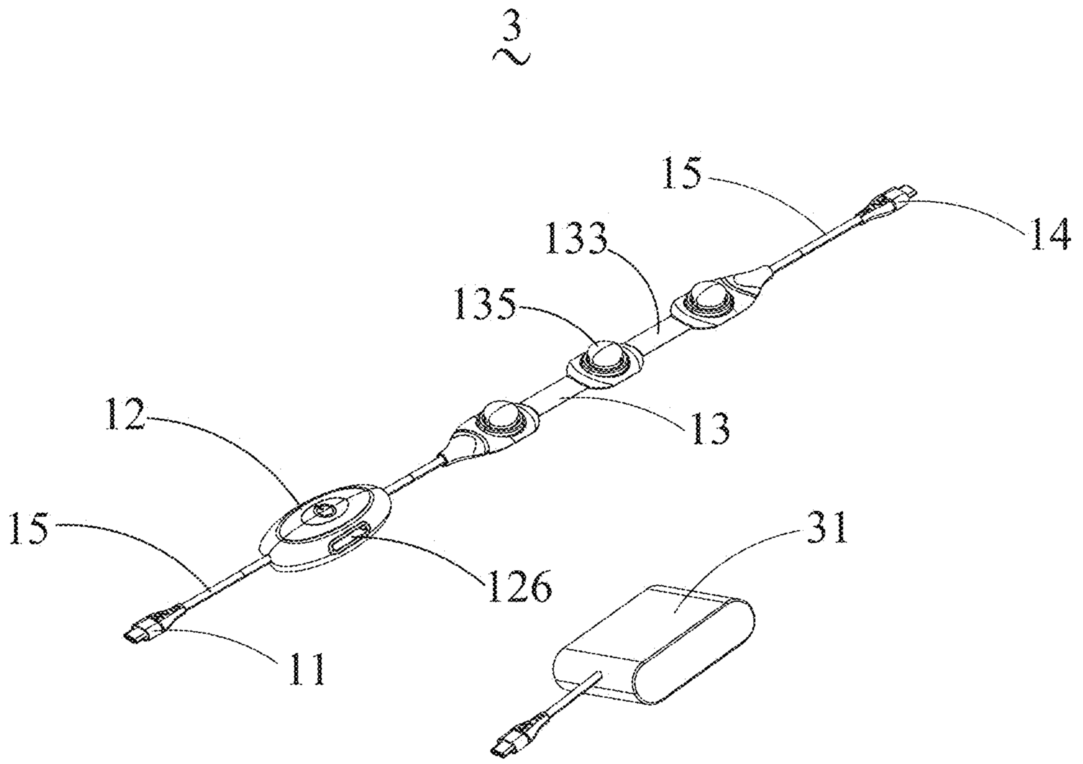
FIG. 13 is a perspective view of the data cable provided by a third embodiment.

Referring to FIG. 13, a third embodiment of the present disclosure provides another data cable 3, which is different from the above data cables 1 and 2 in that:

The data cable 3 also includes a detachable massage accessory 31, the master control module 12 is provided with an output interface 126, and the massage accessory 31 is electrically connected with the master control module 12 through the output interface 126.

It can be appreciated that the massage accessory 31 is provided with a connector matched with the output interface 126, and power is supplied to the output interface 126 through the connector. This design allows the user to use the massage accessory 31 while massaging through the massage module 13. The massage accessory 31 is designed to be detachable, and it is connected for power supply through the output interface 126 only when needed, which does not affect the overall appearance structure of the data cable 1, and at the same time makes the massage accessory 31 more convenient to maintain and replace.

Further, the massage accessory 31 is one or more of vibrating massage member, heating massage member and electric pulse massage member.

It can be appreciated that different massage accessories 31 can have different massage effects, and users can choose according to their preferences, and massage accessories 31 are selected to massage other parts while massaging with the massage module 13.

It can be appreciated that when the massage accessories 31 are arranged as various massage members, and a plurality of massage accessories 31 can be further arranged in parallel or in series. This design can enhance the flexibility of massage accessories 31, provide users with richer massage experience, and facilitate centralized control and simplify the operation flow of users.

It can be appreciated that the massage accessory 31 can be detachably arranged, allowing its appearance and design to be more flexible. Specifically, in this embodiment, the shape and structure of the massage accessories 31 are not specifically limited, and a specific massage accessory 31 can be arranged for a body part prone to fatigue, for example, the massage accessory 31 is a hot compress eye mask.

It can be appreciated that the remaining structures of the data cable 3 are the same as those of the data cable 1 or the data cable 2, and have the same beneficial effects, which will not be described in detail here.

Figure 14:
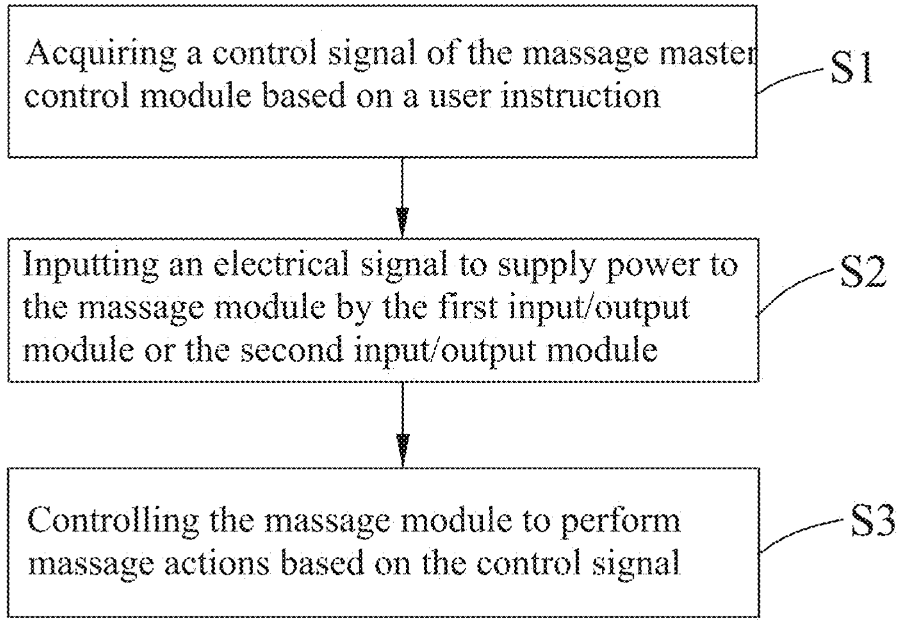
FIG. 14 is a flowchart of the steps of the data cable massage control method provided by a fourth embodiment.

Referring to FIG. 14, a fourth embodiment of the present disclosure provides a data cable massage control method. The data cable includes a first input/output module, a master control module, a massage module and/or a second input/output module which are connected in sequence. The first input/output module and/or the second input/output module are connected with external device for inputting and outputting electrical signals and data signals. The massage module receives and transmits electrical signals and data signals, and receives control signals at the same time. The massage module includes massage function parts, and the massage function parts perform massage actions according to the control signals. Specifically, in this embodiment, the data cable includes the data cable 1, the data cable 2 or the data cable 3 as described above.

The method includes the following steps:

S1, acquiring a control signal of the massage master control module based on a user instruction;

S2, the first input/output module or the second input/output module inputting an electrical signal to supply power to the massage module; and S3, controlling the massage module to perform massage actions based on the control signal.

It can be appreciated that the method is simple and intuitive to operate, and the user can operate the massage module to perform massage actions only by inputting user instructions, and the massage module can supply power through both the first input/output module and the second input/output module, which is convenient for the user to operate and does not need to identify the direction of the data cable.

It can be appreciated that a data cable 1 includes a first input/output module 11, a master control module 12, a massage module 13 and/or a second input/output module 14 connected in sequence.

The first input/output module 11 and/or the second input/output module 14 are connected with external devices for inputting and outputting electrical signals and data signals.

It can be appreciated that the first input/output module 11 and the second input/output module 14 are connected with external electronic devices such as mobile phones and notebook computers, which can not only realize the functions of data transmission and electric transmission, but also supply power to the master control module 12 and the massage module 13 through external devices.

Figure 15:
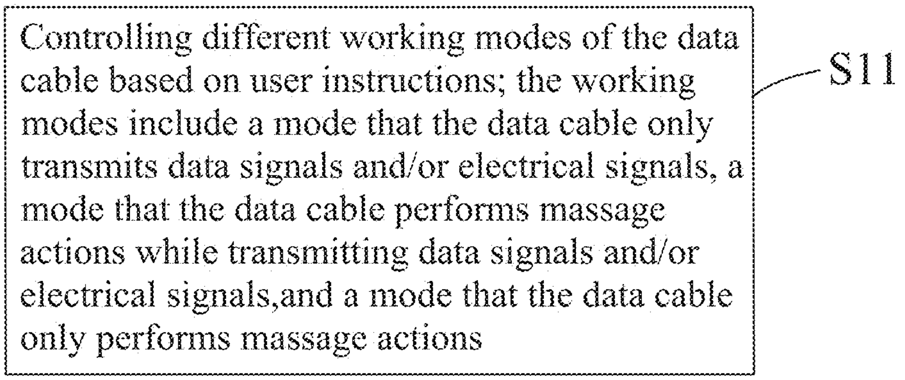
FIG. 15 is a flowchart of step S1 of the data cable massage control method provided in the fourth embodiment.

Referring to FIG. 15, step S1 of the data cable massage control method further includes the following steps:

S11, different working modes of the data cable are controlled based on user instructions; the working modes include a mode that the data cable only transmits data signals and/or electrical signals, a mode that the data cable performs massage actions while transmitting data signals and/or electrical signals, and a mode that the data cable only performs massage actions It can be appreciated that in the data cable massage control method, the data cable has three different working modes, which can meet the different use requirements of users. The users can select different working modes only by inputting corresponding user instructions, and the operation is simple and convenient. This method also has the same beneficial effects as the above-mentioned data cables 1, 2 and 3, which will not be described in detail here.

Compared with the prior art, the data cable and the massage control method thereof provided by the present disclosure have the following beneficial effects:

1. The data cable provided by the present disclosure can not only realize the basic functions of data transmission, device charging and the like, but also allow the user to enjoy massage at the same time. In addition, users can independently control the start, stop and adjustment modes of the massage module through the master control module, which is simple and convenient to operate and improves the personalization and flexibility of massage. The first input/output module, the master control module, the massage module and/or the second input/output module are connected in sequence, so that the overall appearance of the data cable is simple and neat, and it is convenient for storage and sorting.

2. The data cable provided by the present disclosure further includes a data cable body, wherein the first input/output module, the master control module, the massage module and the second input/output module are connected in sequence through the data cable body. This design does not need additional branches, avoiding damaging the overall linear structure of the data cable. At the same time, the users may use the length of the data cable to realize winding and fixing the body part, so that the massage module can be more closely attached to the massage part of the human body and get a better massage experience.

3. According to the data cable provided by the present disclosure, the massage module includes a flexible circuit structure, and the massage function parts are electrically connected with the master control module through the flexible circuit structure. The massage function parts obtain electrical signals and control signals needed for work through the flexible circuit structure. At the same time, the flexible circuit structure can make the massage module flexible, which is convenient for the massage module to better fit the human body curve and contact with the massage part more closely, so that users can get a better massage experience. There are at least two massage function parts. A plurality of massage function parts can enhance the massage effect, and at the same time, different massage effects can be realized through different layouts and cooperation among the massage function parts.

4. According to the data cable provided by the present disclosure, the massage function part is arranged on the central axis of the massage module, which plays the role of counterweight, so that the whole center of gravity of the massage module is on the central axis, and it is not likely to turn up due to the deviation of the center of gravity when the massage module is attached to the human body for massage, thus reducing the twisting and winding of the data cable in the use process. Massage function parts are sequentially arranged at intervals along the length direction of the massage module, which can form a wider massage area and realize multi-dimensional massage effect at the massage part. Moreover, there are gaps between massage function parts arranged at intervals, and the bending radian of the massage module can be adjusted by changing the size of the gaps, so that the overall design of the data cable is more flexible.

5. According to the data cable provided by the present disclosure, the massage function parts are arranged in parallel through the flexible circuit structure. This design improves the reliability and stability of the data cable. Even if one massage function part fails, other massage function parts can still work normally, thus preventing the paralysis of the whole massage module, having high fault tolerance and reducing the risk of equipment failure due to a single point of failure. Each massage function can be operated and maintained independently, which helps to reduce the maintenance cost and prolong the service life. In addition, the parallel design facilitates the unified control of multiple massage function parts by the master control module and simplifies the operation of users.

6. According to the data cable provided by the present disclosure, the massage module further includes a bendable shell, so that the whole massage module can be bent, and the massage module can further conform to the curve of the human body, especially the parts with complex curved surfaces such as the neck and shoulders. The user can use the linear structure of the data cable to realize the winding of the body part, so that the massage module can be better fixed and attached to the part to be massaged, and the accuracy and comfort of massage are further improved. The shell is provided with a flexible massage part corresponding to the massage function part, and two opposite sides of the massage part are provided with massage structures. The massage part is arranged corresponding to the massage function part, which can ensure that the intensity decline of massage is reduced and the massage effect is guaranteed. The flexible massage part can reduce the pressure of the massage module on the skin, avoid discomfort or pain, and at the same time make the distribution of massage force more uniform and improve the user experience. Two opposite sides of the massage part are provided with massage structures. The massage structures on both sides can provide richer massage experience, and two different massage effects can be achieved by setting different massage structures on both sides.

7. According to the data cable provided by the present disclosure, the massage part is provided with a cavity for accommodating the massage function parts, and the inner wall of the cavity is provided with a boss, which can better fix the massage function parts in the cavity, and when the massage function parts vibrate and massage, they can fully drive the massage part to vibrate together, so as to achieve better cooperation with the massage structure and obtain a better massage experience.

8. According to the data cable provided by the present disclosure, an elastic structure is arranged on the periphery of the massage structure on at least one side. When the massage action of the massage function part is a vibration signal, the elastic structure increases the moving range of the massage function part when it generates vibration and increases the vibration space. At the same time, the vibration effect of the massage function part can be concentrated on the massage structure, and the attenuation caused by the transmission of vibration to the rest of the shell is reduced.

9. According to the data cable provided by the present disclosure, the elastic structure includes a first annular groove, an annular protrusion and a second annular groove which are connected in sequence, and the elastic structure forms an approximate "arch"-shaped structure. When the massage action of the massage function part is a vibration signal, the design can effectively increase the vibration range of the massage function part in all directions, obtain a better vibration massage effect, and effectively prevent the vibration from spreading to other parts.

10. According to the data cable provided by the present disclosure, the data cable includes a bidirectional signal identification circuit for identifying the transmission directions of electric signals and data signals. The bidirectional signal identification circuit is used to ensure the bidirectional transmission of electrical signals and data signals, which ensures that the control module and the massage module can supply power and transmit data through the first input/output module, and can also supply power and transmit data through the second input/output module, which is convenient for users to operate and does not need to identify the direction of the data cable. At the same time, the first input/output module and the second input/output module are connected with external devices, and the users can use the electronic devices they carry with them, such as mobile phones, notebook computers, charging treasures, etc., to supply power to the control module and the massage module, which greatly expands the use scenarios and is convenient for users to massage anytime and anywhere.

11. According to the data cable provided by the present disclosure, the master control module includes a functional control unit, which is electrically connected with the massage module and used for receiving user instructions and outputting corresponding control signals to the massage module according to the user instructions. The user can input different user instructions, and the functional control unit processes the input user instructions and outputs corresponding control signals to the massage module to control the start, stop and adjustment modes of the massage module. This design simplifies the operation process, and the user can control the massage module by directly inputting user instructions.

12. According to the data cable provided by the present disclosure, the functional control unit includes a signal input unit through which user instructions are received, and the signal input unit can improve the response speed and accuracy of the functional control unit. The signal input unit can be designed as multi-source input, not limited to physical buttons, but also including input modes such as voice recognition, which can meet the needs and preferences of different users.

13. According to the data cable provided by the present disclosure, the user's instructions are input through the external device connected with the first input/output module or the second input/output module. This design can provide a more intuitive and convenient operation interface on the external device, and the user can make customization according to his own preferences.

14. According to the data cable provided by the present disclosure, the master control module further includes a voltage conversion unit. A first voltage introduced from the first input/output module or a second voltage introduced from the second input/output module is converted into a third voltage by the voltage conversion unit, and the third voltage is introduced into the massage function. The first voltage and the second voltage can be input from a power supply or an external device, therefore, the voltage values of the input first voltage and the second voltage may be different, and the massage function is not supported to work. By outputting a suitable and stable third voltage through the voltage conversion unit, the stable operation of the functional control unit and the massage module can be ensured, and each element will not be damaged due to an excessively high input voltage, and the operation efficiency will not be reduced due to an excessively low voltage.

15. The data cable provided by the present disclosure includes a main charging circuit for charging and a massage branch circuit connected in parallel with the main charging circuit, and massage function parts are arranged on the massage branch circuit. The main charging circuit and the massage branch circuit are relatively independent, so that whether the massage function parts work or not will not affect the working state of the main charging circuit, and the massage function parts can still work normally when the data cable is connected with the equipment for charging or data transmission. Moreover, the parallel design makes the data cable easier to maintain, and even if the massage branch circuit fails, the main charging circuit can still work normally without affecting the use. The voltage conversion unit is arranged on the massage branch circuit, and the circuit design ensures that the first voltage and the second voltage must pass through the voltage conversion unit and be converted into the third voltage to ensure the normal operation of the massage function parts.

16. According to the data cable provided by the present disclosure, the massage action includes one or more of vibration signal, electric pulse signal and thermal signal. A variety of massage actions can provide a richer massage experience. Vibration signals can promote muscle relaxation and relieve muscle tension through mechanical action, which can effectively relieve muscle fatigue and soreness. Electrical pulse signals can stimulate nerves and muscles, so as to relieve muscle fatigue and promote blood circulation. Thermal signal transfers heat to the skin and tissues to achieve the effect of hot compress. Adjustment modes include one or more of massage intensity adjustment, massage mode adjustment and timing adjustment. Different adjustment modes can meet different needs of users, and massage intensity adjustment allows users to choose massage intensity according to their personal preferences and affordability. Massage mode adjustment can simulate different massage techniques and effects. For example, when the massage action of the massage function part is a vibration signal, the vibration effect changes from weak to strong, from weak to strong, or from fast to slow. Timing adjustment is convenient for users to control massage time and prevent excessive massage.

17. According to the data cable provided by the present disclosure, the data cable further includes a detachable massage accessory, the master control module is provided with an output interface, and the massage accessory is electrically connected with the master control module through the output interface. The massage accessory is connected and supplied with power through the output interface, allowing users to use the massage accessories while massaging with the massage module. The massage accessory is detachable and can be connected through the output interface only when needed, which does not affect the overall appearance structure of the data cable and makes the massage accessories more convenient to maintain and replace.

18. According to the data cable provided by the present disclosure, the massage accessories are one or more of vibrating massage parts, heating massage parts and electric pulse massage parts. Different massage accessories can have different massage effects, and users can choose according to their preferences.

19. The present disclosure further provides a data cable massage control method, wherein the data cable includes a first input/output module, a master control module, a massage module and/or a second input/output module which are connected in sequence. The method includes: acquiring a control signal of the massage master control module based on a user instruction; the first input/output module or the second input/output module inputting an electrical signal to supply power to the massage module; and controlling the massage module to perform massage actions based on the control signal. The method is simple and intuitive to operate, and the user can operate the massage module to perform massage actions only by inputting user instructions, and the massage module can supply power through the first input/output module or the second input/output module, which is convenient for the user to operate and does not need to identify the direction of the data cable.

20. The data cable massage control method provided by the present disclosure further includes: controlling different working modes of the data cable based on the user instruction; the working modes include a mode that the data cable only transmits data signals and/or electrical signals, a mode that the data cable performs massage actions while transmitting data signals and/or electrical signals, and a mode that the data cable only performs massage actions. The data cable has three different working modes, which can meet the different needs of users. The data cable massage control method also has the same beneficial effects as the above data cable, and will not be described in detail here.

In the embodiment provided by the present disclosure, It should be appreciated that "B corresponding to A" means that B is associated with A, and B can be determined according to A. However, it should also be appreciated that determining B according to A does not mean determining B only according to A, but also mean determining B according to A and/or other information.

It should be appreciated that references to "one embodiment" or "an embodiment" throughout the specification mean that a particular feature, structure or characteristic related to an embodiment is included in at least one embodiment of the present disclosure. Therefore, the appearances of "in one embodiment" or "in an embodiment" in various places throughout the specification do not necessarily refer to the same embodiment. Furthermore, these particular features, structures, or characteristics may be combined in any suitable manner in one or more embodiments. Those skilled in the art should also conceive that the embodiments described in the specification are all optional embodiments, and the actions and modules involved are not necessarily necessary for the present disclosure.

In various embodiments of the present disclosure, it should be appreciated that the sequence number of the above-mentioned processes does not mean the inevitable sequence of execution, the execution sequence of each process should be determined according to its function and internal logic, and should not constitute any limitation on the implementation process of the embodiment of the present disclosure.

Flowcharts and block diagrams in the drawings of the present disclosure illustrate the architecture, functions and operations of possible implementations of systems, methods and computer program products according to various embodiments of the present application. In this regard, each block in the flowchart or block diagram may represent a module, a program segment or a part of code, which contains one or more executable instructions for implementing specified logical functions. It should also be noted that in some alternative implementations, the functions noted in the blocks may occur in a different order than those noted in the drawings. For example, two blocks indicated in succession may actually be executed substantially in parallel, and they may sometimes be executed in the reverse order, which is determined here based on the functions involved. It is particularly important to note that each block in the block diagrams and/or flowcharts, and combinations of blocks in the block diagrams and/or flowcharts, can be realized by a dedicated hardware-based system that performs specified functions or operations, or can be realized by a combination of dedicated hardware and computer instructions.

A data cable and a massage control method thereof disclosed in the embodiment of the present disclosure are described in detail above. In this specification, the principle and implementation of the present disclosure are expounded with reference to specific embodiments. The description of the above embodiments is only used to help understanding of the method and its core idea of the present disclosure. At the same time, according to the idea of the present disclosure, there will be some changes in the specific implementation and application scope for those skilled in the art. To sum up, the contents of this specification should not be construed as limitations on the present disclosure, and all modifications, equivalent substitutions and improvements made within the principles of the present disclosure shall be included in the protection scope of the present disclosure.

The invention claimed is:

1. A data cable, comprising:

a first input/output module, a master control module, a massage module, and a second input/output module which are connected in sequence;

wherein the first input/output module and the second input/output module are selected from the group consisting of: USB Type-A connectors, USB Type-B connectors, USB Type-C connectors, or Lightning connectors;

wherein at least one of the first input/output module and the second input/output module is configured to be connected with an external device for inputting and outputting electrical signals and data signals;

wherein the master control module is configured to receive and transmit the electrical signals and the data signals, and at the same time send out control signals for controlling a start-stop mode or an adjustment mode of the massage module; and wherein the massage module further comprises massage function parts, and the massage function parts are configured to perform a massage action according to the control signals;

a main charging circuit for charging and a massage branch circuit, wherein a parallel connection is established between the massage branch circuit and the main charging circuit, wherein the massage function parts are arranged on the massage branch circuit;

a bidirectional signal identification circuit configured as an On-The-Go circuit for detecting connection of the external device to the first input/output module or the second input/output module, identifying a transmission direction of the electrical signals and the data signals, and transmitting signals between the first input/output module and the second input/output module, wherein when at least one of the first input/output module and the second input/output module is connected with the external device, the external device is configured to be charged, or is configured to provide power to the master control module and the massage module.

2. The data cable according to claim 1, wherein the data cable further comprises a data cable body, and the first input/output module, the master control module, the massage module and the second input/output module are connected in sequence through the data cable body.

3. The data cable according to claim 1, wherein the massage module comprises a flexible circuit structure, and the massage function parts are electrically connected with the master control module through the flexible circuit structure; and at least two massage function parts are provided.

4. The data cable according to claim 1, wherein the massage function parts are arranged on a central axis of the massage module, and the massage function parts are sequentially arranged at intervals along a length direction of the massage module.

5. The data cable according to claim 3, wherein the massage function parts are arranged in parallel by the flexible circuit structure.

6. The data cable according to claim 1, wherein the massage module further comprises a bendable shell, the bendable shell is provided with a flexible massage part corresponding to the massage function parts, and massage structures are arranged at two opposite sides of the flexible massage part.

7. The data cable according to claim 6, wherein the flexible massage part is provided with a cavity for accommodating the massage function parts, and a boss is arranged on an inner wall of the cavity.

8. The data cable according to claim 6, wherein a periphery of the massage structures on at least one side of the data cable is provided with an elastic structure.

9. The data cable according to claim 8, wherein the elastic structure comprises a first annular groove, an annular protrusion, and a second annular groove which are sequentially connected.

10. The data cable according to claim 1, wherein the master control module comprises a functional control unit which is electrically connected with the massage module and used for receiving user instructions and outputting corresponding control signals to the massage module according to the user instructions.

11. The data cable according to claim 10, wherein the functional control unit comprises a signal input unit through which the user instructions are received.

12. The data cable according to claim 10, wherein the user instructions are input through the external device connected to the first input/output module or the second input/output module;

the external device further includes an application program for receiving user instructions; and the user instructions are configured to be transmitted to the master control module by the first input/output module or the second input/output module to control the start-stop mode or an adjustment mode of the massage module.

13. The data cable according to claim 1, wherein the master control module further comprises a voltage conversion unit; a first voltage introduced from the first input/output module or a second voltage introduced from the second input/output module is converted into a third voltage by the voltage conversion unit, and the third voltage is introduced into the massage function parts.

14. The data cable according to claim 13, wherein the voltage conversion unit is arranged on the massage branch circuit.

15. The data cable according to claim 1, wherein the massage action is one or more of a vibration signal, an electric pulse signal, and a thermal signal, and the adjustment mode comprises one or more of massage intensity adjustment, massage mode adjustment, and timing adjustment.

16. The data cable according to claim 1, wherein the data cable further comprises a detachable massage accessory, the master control module is provided with an output interface, and the massage accessory is electrically connected with the master control module through the output interface.

17. The data cable according to claim 16, wherein the massage accessory is one or more of a vibrating massage part, a heating massage part, and an electric pulse massage part.

* * * * *